(12) United States Patent
Song et al.

(10) Patent No.: US 7,133,488 B2
(45) Date of Patent: Nov. 7, 2006

(54) NEUTRON FLUX MAPPING SYSTEM FOR NUCLEAR REACTOR

(75) Inventors: Seong-Il Song, Daejeon Metropolitan (KR); Byung-Hak Cho, Daejeon Metropolitan (KR); Chang-Hoon Shin, Daejeon Metropolitan (KR); Seung-Hyun Byun, Daejeon (KR)

(73) Assignee: Korea Electric Power Corporation, Seoul (KR)

( * ) Notice: Subject to any disclaimer, the term of this patent is extended or adjusted under 35 U.S.C. 154(b) by 148 days.

(21) Appl. No.: 10/930,103

(22) Filed: Aug. 31, 2004

(65) Prior Publication Data
US 2005/0154478 A1 Jul. 14, 2005

(30) Foreign Application Priority Data
Jan. 9, 2004 (KR) .................. 10-2004-0001393

(51) Int. Cl.
*G21C 17/108* (2006.01)
(52) U.S. Cl. .................. 376/254; 250/391; 250/390.14
(58) Field of Classification Search ............... 376/254; 250/390.1, 391
See application file for complete search history.

(56) References Cited

U.S. PATENT DOCUMENTS

| | | | |
|---|---|---|---|
| 3,860,824 A * | 1/1975 | Stone .................. 250/390.01 |
| 4,255,234 A * | 3/1981 | Neuner et al. ............... 376/254 |
| 4,268,354 A * | 5/1981 | Wassel et al. ............... 376/254 |
| 4,839,134 A * | 6/1989 | Impink et al. ............... 376/216 |
| 4,986,954 A * | 1/1991 | Feurgard .................. 376/254 |
| 5,164,895 A * | 11/1992 | Lunz et al. .................. 700/9 |
| 5,179,515 A * | 1/1993 | Lunz et al. .................. 700/126 |
| 6,633,622 B1 * | 10/2003 | Kuribayashi et al. ....... 376/254 |
| 2002/0126790 A1 * | 9/2002 | Kuribayashi et al. ....... 376/254 |

FOREIGN PATENT DOCUMENTS

JP 02019795 A * 1/1990

* cited by examiner

*Primary Examiner*—Albert Gagliardi
(74) *Attorney, Agent, or Firm*—Daly, Crowley, Mofford & Durkee, LLP

(57) ABSTRACT

A neutron flux mapping system for a nuclear reactor including: drivers each including a geared motor, a helical gear driven by the geared motor, and a storage reel adapted to supply, to the helical gear, a detector cable carrying a detector; and a double indexing path selector unit including upper and lower fixed plates, a fixed shaft, an outer path selector rotatably mounted to the upper fixed plate, and inner path selectors. The outer path selector includes an upper rotating plate rotatably mounted to the upper fixed plate while carrying a drive unit for rotating the outer path selector about the fixed shaft, and a control unit for controlling the drive unit, and a lower rotating plate connected to the upper rotating plate. Each inner path selector includes a hollow rotating shaft rotatably mounted between the upper and lower rotating plates, a path select tubing connected to the rotating shaft to rotate along with the rotating shaft, and a disc mounted to a lower end of the rotating shaft, and provided with a plurality of circumferentially-arranged paths.

26 Claims, 16 Drawing Sheets

FIG.10c

Truth Table of Operations of Path Select Switches

| Matrix Signal | SWITCH NUMBER | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| a | H | H | H | H | L | L | L | L | L | L | L | L | L | L | L | L |
| b | L | L | L | L | H | H | H | H | L | L | L | L | L | L | L | L |
| c | L | L | L | L | L | L | L | H | H | H | H | H | L | L | L | L |
| d | L | L | L | L | L | L | L | L | L | L | L | L | H | H | L | L |
| w | L | H | H | H | H | H | H | H | L | L | H | L | H | L | H | H |
| x | H | L | H | H | H | L | H | H | H | H | H | H | L | H | H | H |
| y | H | H | L | H | H | H | L | H | H | L | L | H | H | H | L | H |
| z | H | H | H | L | H | H | H | L | H | H | H | L | H | H | H | L |
| Hex Number | 87 | 8B | 8D | 8E | 47 | 4B | 4D | 4E | 27 | 2B | 2D | 2E | 17 | 1B | 1D | 1E |

FIG.12
| Rotated Angle | Operation Mode | Positions of Inner Path Selectors and Rotors of Guide Tubing Anti-twister Unit |
|---|---|---|
| 0° | Alt.#1 | 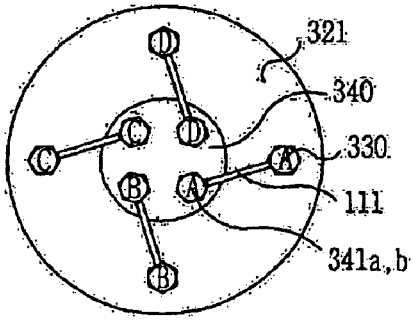 |
| 90° | Normal | 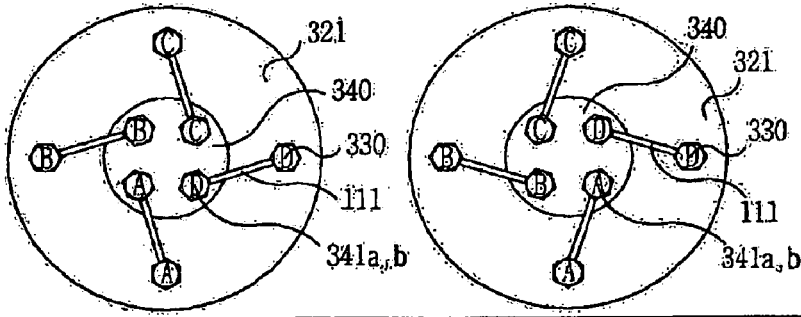 |
| 180° | Alt.#2 | 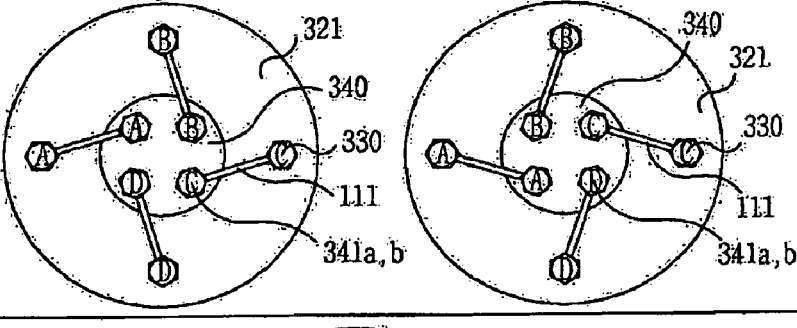 |
| 270° | Alt.#3 | 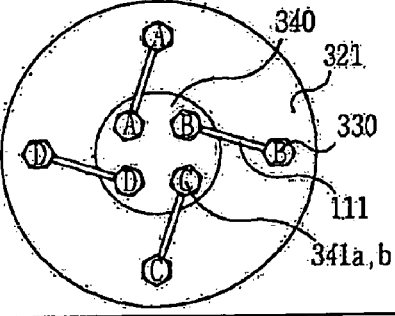 |

NEUTRON FLUX MAPPING SYSTEM FOR NUCLEAR REACTOR

CROSS-REFERENCE TO RELATED APPLICATIONS

The present application claims priority under The Paris Convention for the Protection of Industrial Property to Korean Application No. 10-2004-0001393 filed at the Korean Intellectual Property Office in DaeJeon Metropolitan City, Korea on Jan. 9, 2004, which application is hereby incorporated by reference.

BACKGROUND OF THE INVENTION

1. Field of the Invention

The present invention relates to a neutron flux mapping system for a nuclear reactor, and more particularly to a neutron flux mapping system for a nuclear reactor which has an improved architecture and an enhanced reliability while being efficient in terms of installation space and maintenance, and to which a substitution means is easily applicable when a failure of a part thereof occurs.

2. Description of the Related Art

A nuclear reactor typically includes 30 to 60 thimbles, depending upon the capacity thereof. In order to produce a neutron flux map along each thimble, a neutron flux mapping system using movable detectors is used. Such a neutron flux mapping system includes detectors, detector cables, drivers adapted to insert or withdraw respective detectors into or out of a core of the nuclear reactor, and path selector units adapted to guide each detector into a particular one of the thimbles. In order to measure neutron flux in a nuclear reactor, four sets of drivers having dedicated detectors, and path selector units are typically used. In accordance with operation of the path selector units adapted to guide the detectors of respective detector/driver sets, the four detectors of respective detector/driver sets can be selectively inserted into associated ones of the thimbles, the number of which may be 30 to 60.

Referring to FIGS. 1a and 1b, a conventional neutron flux mapping system is illustrated. The conventional neutron flux mapping system includes drivers 10, inlet detector guide tubings 11 each connected, at one end thereof, to an associated one of the drivers 10 while having a tubular shape to allow a detector to pass therethrough, and a path selector unit 30 connected to the other end of each inlet detector guide tubing 11. A detector cable, which carries a detector at a leading end thereof, is wound in each driver 10. In accordance with operation of each driver 10, the detector of the associated detector cable is inserted into the path selector unit 30 via the associated inlet detector guide tubing 11, and then is inserted into a selected one of the thimbles via the path selector 30.

As shown in FIG. 1b, the conventional path selector system 30 has a double layered architecture having upper and lower layers, at which four upper path selectors 31 and four lower path selectors 32 are arranged, respectively. The path selector system 30 may also have a triple layered architecture. The layers of the path selector system 30 are connected by a plurality of detector guide tubings. That is, detector guide tubings extend from each of the upper path selectors 31, and are distributed to respective lower path selectors 32.

In the above mentioned conventional neutron flux mapping system, each detector cable is inserted into a selected one of the thimbles via the associated upper and lower path selectors 31 and 32 in accordance with the associated driver 10, so as to achieve a remote neutron flux detection.

However, the above mentioned conventional neutron flux mapping system is complex in architecture and occupies an excessive space because the path selector unit 30 has a double layered architecture. For this reason, there are a difficulty in managing the system, and thus, an increased possibility of failure.

Furthermore, the interlayer distance of the path selector system 30, that is, the distance between the upper and lower path selectors 31 and 32, is short, thereby causing the detector guide tubings connecting the path selectors 31 and 32 to have a severe curvature. As a result, the detector cables reciprocating along the detector guide tubings may exhibit increased friction, thereby damaging the detectors, which are expensive. A failure may frequently occur in the drivers 10, which operate to insert or withdraw the detector cables. When a failure occurs in this system, a required repair should be carried out in the interior of a reactor containment vessel, that is, a highly radioactive region. In this case, there is a difficulty in performing tasks in that workers who perform tasks in the interior of the reactor containment vessel may be exposed to a large amount of radiation.

In addition, in the conventional neutron flux mapping system, the lower path selectors 32 are connected to thimble isolation valves (that is, the thimbles), respectively, in a 1:1 manner For this reason, if even one of the lower path selectors 32 fails, the overall system cannot operate normally because it is impossible to measure neutron flux through the thimbles associated with the failed path selector. In this case, there is a reduction in power generation rate or the plant should be shut down.

Meanwhile, each driver 10 should insert or withdraw the associated detector cable into or out of a desired thimble at a constant speed. However, the drivers 10 may frequently be rendered inoperable because of the structural problems, for example, the serious friction generated between the detector cables and the guide tubings, which is common in the conventional multiple layered path selector systems, cause the helical gear to exert excessive force which may result in wear or failure in the elements associated therewith. Furthermore, different stresses may be generated at each detector cable, depending on a variation in the insertion or withdrawal distance of the detector cable. For this reason, the expensive detector cable may frequently be damaged.

SUMMARY OF THE INVENTION

Therefore, an object of the invention is to provide a neutron flux mapping system for a nuclear reactor, which has improvements in structures of drivers, path selectors, etc., thereby being effective in terms of installation space, while achieving a reduction in the failure rate thereof so that it is more safe and efficient in terms of maintenance and repair.

Another object of the invention is to provide a neutron flux mapping system for a nuclear reactor, which is capable of, even when a failure occurs in a part of path selectors thereof, achieving measurement of neutron flux through all thimbles, using the remaining path selector(s).

In accordance with the present invention, these objects are accomplished by providing a neutron flux mapping system for a nuclear reactor comprising:

drivers each including a geared motor, a helical gear driven by the geared motor, and a storage reel adapted to supply, to the helical gear, a detector cable carrying a detector; and a double indexing path selector unit including
  a body including upper and lower fixed plates, and tie rods connecting the upper and lower fixed plates,
  a fixed shaft fixedly mounted at a central portion of the body,
  an outer path selector arranged to be rotatable about the fixed shaft,
  the outer path selector including an upper rotating plate arranged to be rotatable about the fixed shaft while carrying a drive unit for rotating the outer path selector about the fixed shaft, and a control unit for controlling the drive unit, and a lower rotating plate arranged to be symmetrical with the upper rotating plate, and connected to the upper rotating plate to rotate along with the upper rotating plate, and
  inner path selectors each including a hollow rotating shaft rotatably mounted between the upper and lower rotating plates of the outer path selector, a path select tubing connected, at an upper end thereof, to an upper end of the rotating shaft in the interior of the rotating shaft while extending downwardly and radially outwardly from the rotating shaft through a hole formed at the rotating shaft, and a disc mounted to a lower end of the rotating shaft, and provided with a plurality of circumferentially-arranged paths.

The geared motor may comprise an induction motor adapted to be controlled by an inverter Each driver may further include means for bring the helical gear into close contact with the detector cable. The means may comprise at least one idle gear.

Each driver may further include an AC torque motor adapted to drive the storage reel.

The upper fixed plate may be provided with stop plates. The control unit of the upper rotating plate may be provided with limit switches, which selectively come into contact with the limit switches, respectively, to be switched to an ON state.

The driving unit and control unit may be mounted on an upper surface of the upper rotating plate.

Each inner path selector may further include an indexing mechanism adapted to rotate the rotating shaft such that the path select tubing is aligned with a selected one of the paths. The indexing mechanism may include a plurality of path select switches arranged around the disc to correspond to the paths, respectively.

Each path select switch may sense alignment of a corresponding one of the paths with the path select tubing, thereby sensing the position of path select tubing. The indexing mechanism may be driven by a geared motor controlled by the position signal.

The double indexing path selector unit may further include tubing anti-twister means.

The neutron flux mapping system may further comprise detector storage guiders each arranged between an associated one of the drivers and the double indexing path selector unit, and a detector storage area adapted to store the detector guided by an associated one of the detector storage guiders.

BRIEF DESCRIPTION OF THE DRAWINGS

The above objects, and other features and advantages of the present invention will become more apparent after reading the following detailed description when taken in conjunction with the drawings, in which:

FIG. 1b is a block diagram illustrating an arrangement of the system shown in FIG. 1a;

FIG. 2b is a block diagram illustrating an arrangement of the system shown in FIG. 2a;

FIG. 10c is a table illustrating various operating states of the matrix switch circuit shown in FIG. 10b;

FIG. 12 is a table illustrating various rotated states of an outer path selector according to the present invention.

DESCRIPTION OF THE PREFERRED EMBODIMENTS

Now, preferred embodiments of the present invention will be described in detail with reference to the annexed drawings.

Figure 2A:
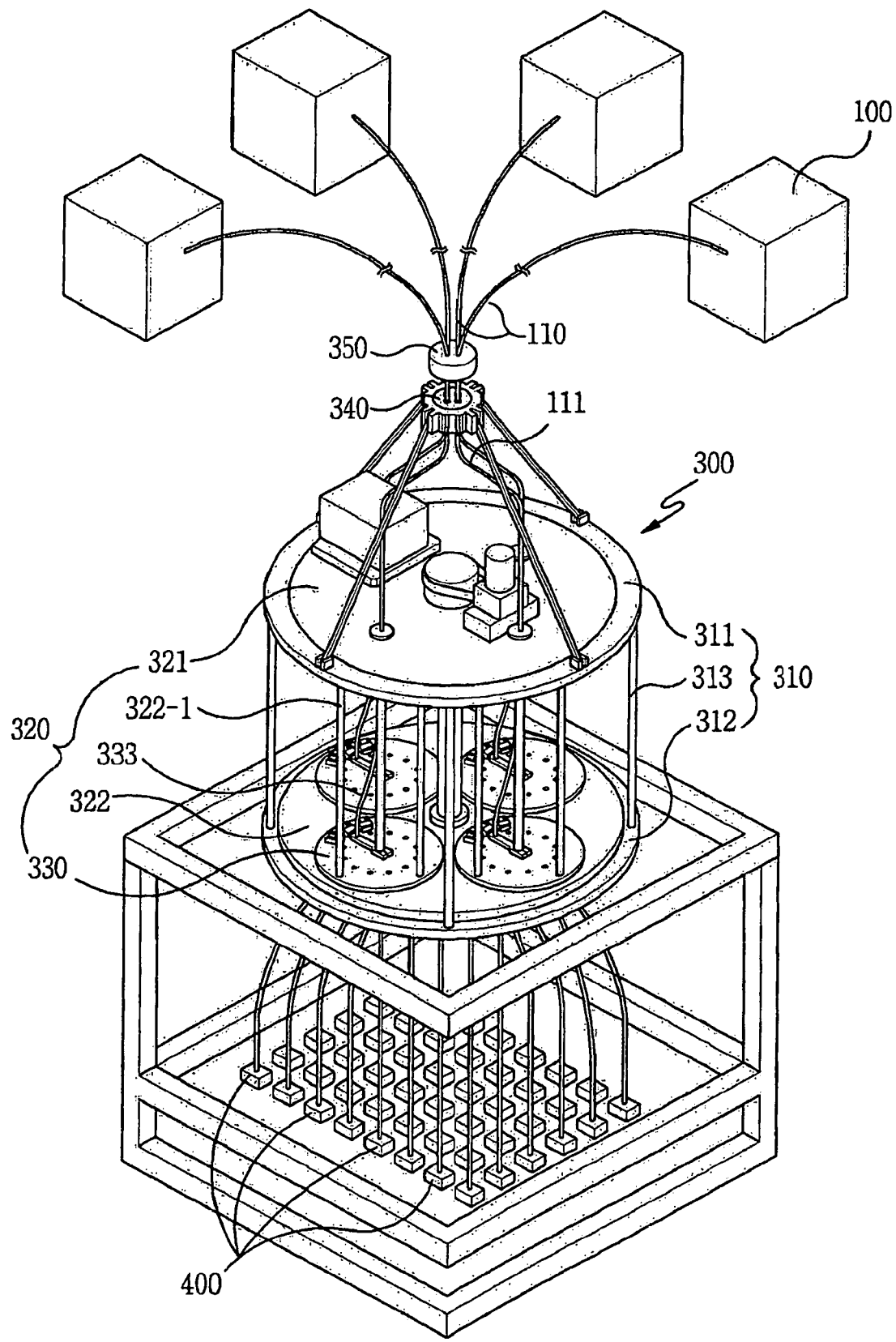
FIG. 2a is a schematic front view illustrating a neutron flux mapping system for a nuclear reactor according to the present invention.

Referring to FIG. 2a, a neutron flux mapping system adapted to produce a map of neutron flux in a nuclear reactor installed in a nuclear power plant in accordance with the present invention is illustrated. As shown in FIG. 2a, the neutron flux mapping system mainly includes drivers 100, and a double indexing path selector unit 300. The neutron flux mapping system also includes tubings 110, 111, and 333 connected to one another, in this order, to extend to a region where inlets of thimble isolation valves 400 are arranged. Each driver 100 is provided with a detector cable carrying a detector (designated by reference numeral "201" in FIG. 3). The detector cable 201 may extend from the associated driver 100, pass through an inlet detector guide tubing 110, an upper detector guide tubing 111 arranged above the path selector unit 300, and a path select tubing 333, in this order, and then enter a selected one of the thimble isolation valves 400 through a lower detector guide tubing. The detector cable 201 inserted into the thimble isolation valve 400 then extends through the associated thimble in the reactor so as to measure neutron flux through the thimble.

(Driver)

Figure 3:
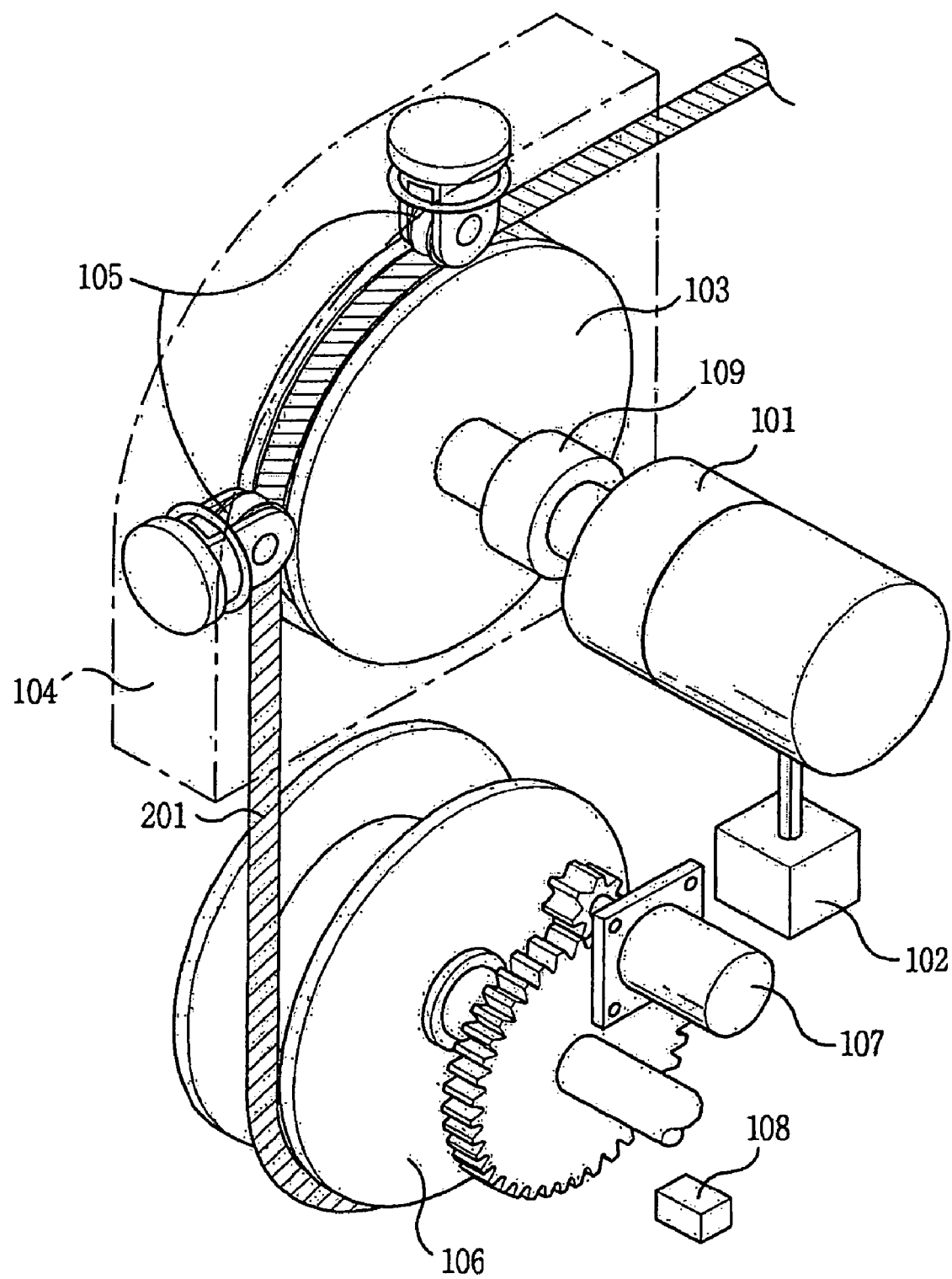
FIG. 3 is a perspective view illustrating an inner configuration of a driver according to the present invention.

As shown in FIG. 3, each driver 100, which is adapted to drive the detector cable 201 associated therewith, includes a geared motor 101, an inverter 102 adapted to control the rotating speed of the geared motor 101, a helical gear 103 connected to the geared motor 101 to be rotated in accordance with rotation of the geared motor 101, and idle gears 105 mounted to a cover 104 attached to a helical gear frame to bring the detector cable 201 into contact with the helical gear 103. The detector cable 201 has a spiral wire wound around the center of the detector cable along the circumference of the cable. The driver 100 also includes a storage reel 106 adapted to pull the detector cable 201 by a constant force, thereby winding the detector cable 201, an AC torque motor 107 adapted to drive the storage reel 106, and an acoustic vibration sensor 108 adapted to remotely monitor a drive state of the driver 100.

The geared motor 101 has a structure in which a gear is attached to an induction motor. The rotating speed of the geared motor 101 is controlled in accordance with frequency and voltage controlled by the inverter 102.

The helical gear 103 has a rotating shaft operatively connected to a rotating shaft of the geared motor 101 via a torque limiter 109. The helical gear 103 is formed with a trough (not shown) at a circumferential surface thereof, and with a spiral groove (not shown) at the trough. When the helical gear 103 rotates, the detector cable 201 is moved along the trough in a state of the spiral of the detector cable being engaged with the spiral groove, so that it is inserted into the core of the reactor through the path selector unit, which will be described hereinafter.

Each idle gear 105 serves to depress the detector cable 201 against the helical gear 103 in order to maintain the detector cable 201 in a state of being seated on the helical gear 103 without being separated from the helical gear 103. In order to adjust the gap between helical gear and idle gear, each idle gear 105 is mounted to the cover 104, using several laminated shims each having a thin sheet structure (as seen in an enlarged view of FIG. 4).

Figure 4:
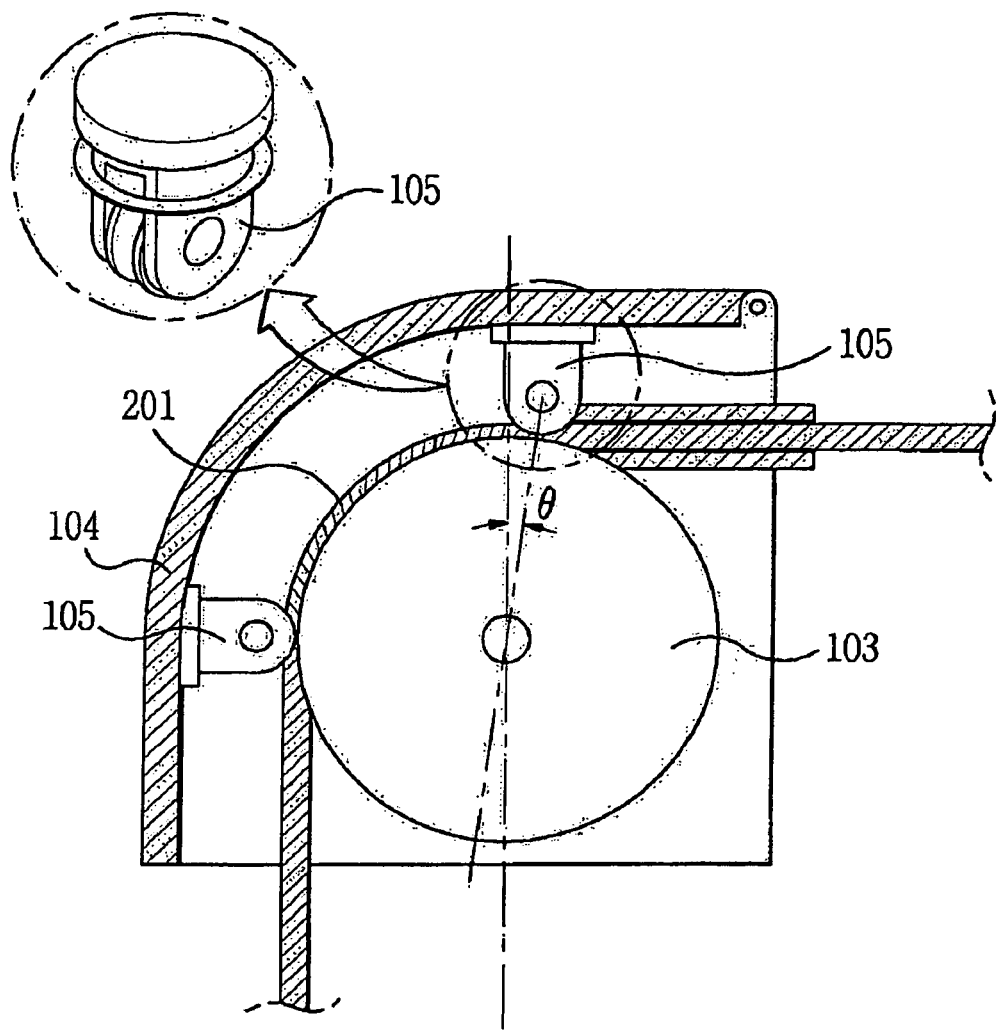
FIGS. 4 and 5 are sectional and perspective views illustrating the configuration of FIG. 3, respectively.

The idle gears 105 are arranged at upper and side surfaces of the cover 104 mounted to the helical gear frame, respectively. As shown in FIG. 4, the upper idle gear 105 is arranged toward an outlet of the driver 100 in advance of a vertical center line of the helical gear 103 by a certain angle θ. With this arrangement, the upper idle gear 105 offsets a force urging the detector cable 201 to rise from the helical gear 103, thereby increasing the contact area between the detector cable 201 and the helical gear 103. Accordingly, an enhancement in power transmission efficiency is obtained.

Figure 5:
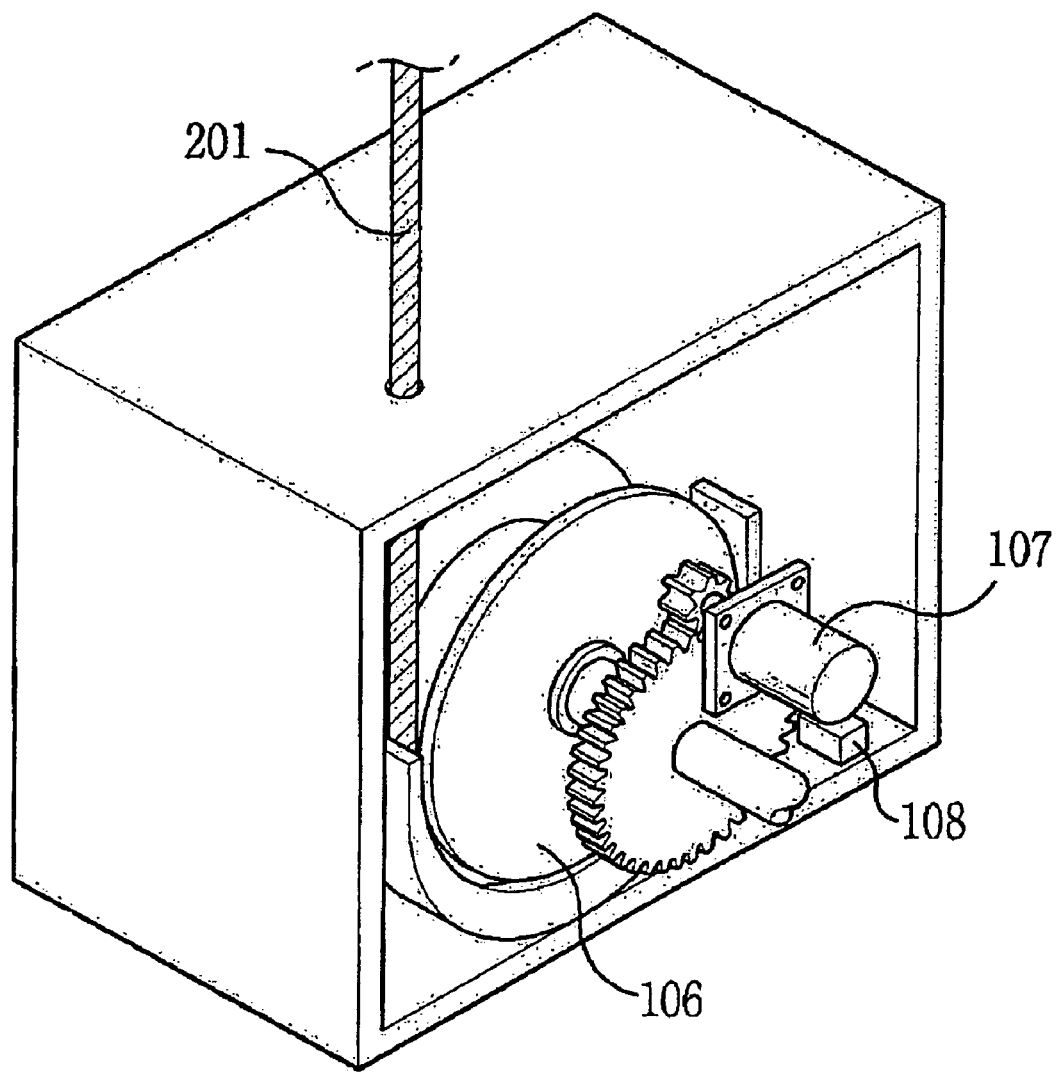

The storage reel 106, which has a structure shown in FIGS. 3 and 5, is adapted to wind the detector cable 201 therearound, thereby storing the detector cable 201. The storage reel 106 pulls the detector cable 201 by a constant force in order to wind the detector cable 201 while preventing the detector cable 201 from being unwound. The AC torque motor 107, which controls rotation of the storage reel 106, is operatively connected with a rotating shaft of the storage reel 106 via a reduction gear. The AC torque motor 107 has characteristics of generating a small torque when the storage reel 106 exhibits a high rotating speed due to a small amount of the detector cable 201 wound therearound, while generating a large torque when the storage reel 106 exhibits a low rotating speed due to a large amount of the detector cable 201 wound therearound. By virtue of such characteristics of the AC torque motor 107, the detector cable 201 is wound around or unwound from the storage reel 106 in a state of being subjected to a constant tension.

The acoustic vibration sensor 108 is mounted to a frame of the driver 100 to remotely monitor the drive state of the driver 100. The acoustic vibration sensor 108 is configured to detect mechanical vibrations, so that sound, which is propagated over air while having the form of noise, cannot be sensed by the acoustic vibration sensor 108. That is, the acoustic vibration sensor 108 senses only a vibration signal generated in the driver 100. For example, when the AC torque motor 107 fails, or when the torque limiter 109 is activated as an excessive force is applied to the detector cable 201, the acoustic vibration sensor 108 is activated. Thus, remote monitoring can be easily achieved.

Double Indexing Path Selector Unit

Figure 6:
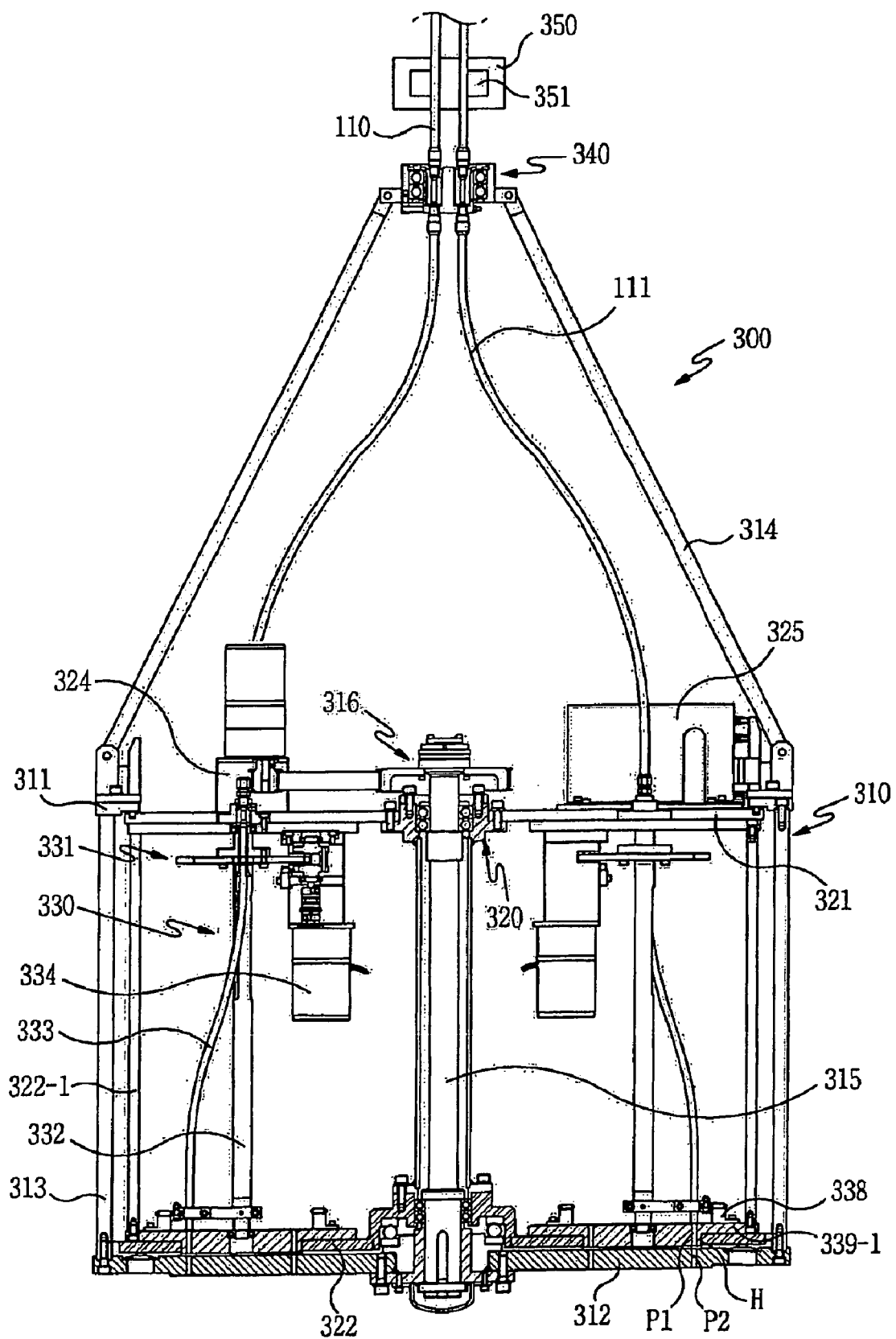
FIG. 6 is a partially-sectioned front view illustrating a double indexing path selector unit according to the present invention.

As shown in FIGS. 2a and 6, the double indexing path selector unit 300 according to the present invention includes a body 310 including upper and lower fixed plates 311 and 312 vertically connected by tie rods 313, an outer path selector 320 including upper and lower rotating plates 321 and 322 arranged inside the body 310 to be rotatable about a fixed shaft 315, and four inner path selectors 330 arranged around the fixed shaft 315 between the upper and lower rotating plates 321 and 322 of the outer path selector 320 while being circumferentially spaced apart from one another by an angle of 90°. The path selector unit 300 also includes a guide tubing anti-twister unit 340 adapted to prevent the inlet detector guide tubing 110 and upper detector guide tubing 111 from being twisted during rotation of the outer path selector 320, thereby preventing the tubings 110 and 111 from being damaged, and a withdraw limit switch assembly 350 adapted to sense passage of the detector cable 201 through the inlet detector guide tubing 110.

As described above, the upper and lower fixed plates 311 and 312 are connected by the tie rods 313. The guide tubing anti-twister unit 340 is arranged above the upper fixed plate 311 while being supported by support rods 314. The lower fixed plate 312 is provided with passes P2 at positions corresponding to those of discs 339-1 included in the inner path selectors 330, respectively.

Figure 7:
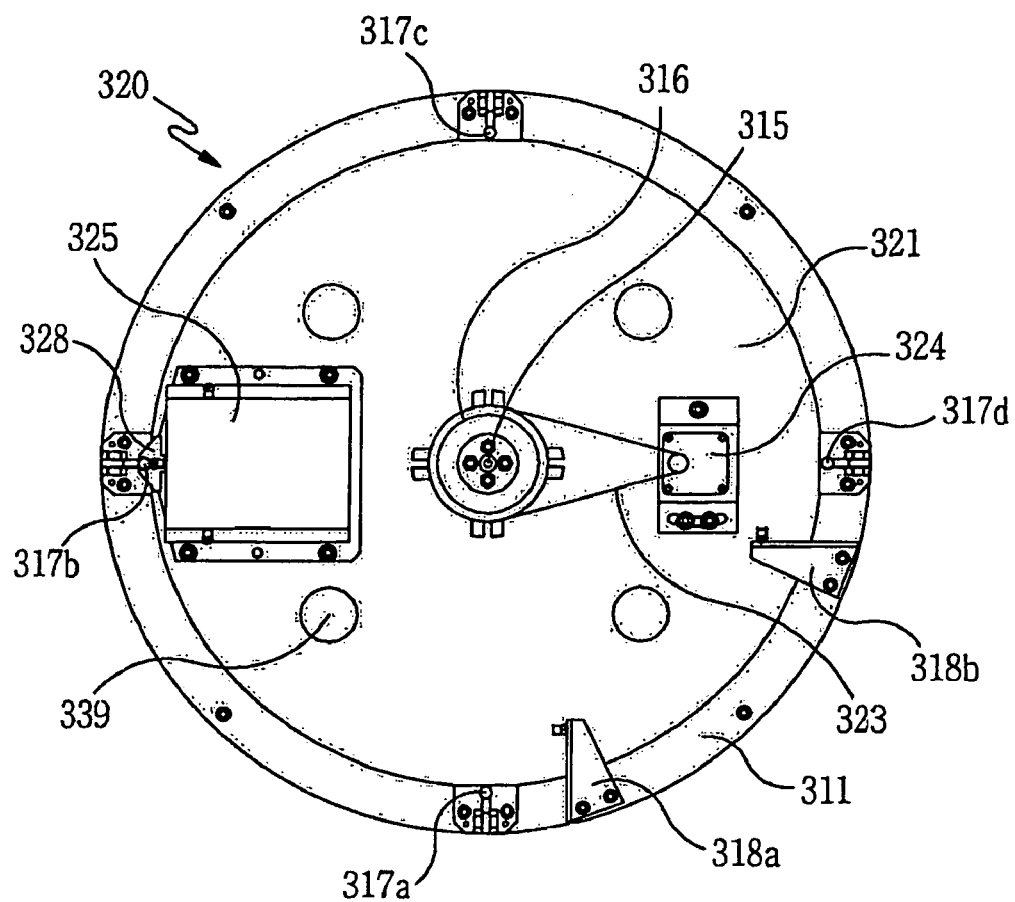
FIG. 7 is a plan view corresponding to FIG. 6.

The upper rotating plate 321 of the outer path selector 320 rotates about the fixed shaft 315 fixedly mounted in the body 310 (as seen in a plan view of FIG. 7). The lower rotating plate 322 (FIG. 6) is connected to the upper rotating plate 321 by a sleeve rotatably fitted around the fixed shaft 315, so that it is rotated along with the upper rotating plate 321. Where the upper and lower rotating plates 321 and 322 are unlimitedly rotated, a twisting phenomenon may occur at the inlet detector guide tubing 110 connected to the driver 100 and the upper detector guide tubing 111 extending from the inlet detector guide tubing 110. In order to avoid such a twisting phenomenon, the rotation of the outer path selector 320 is limited to a certain angle. This limitation is achieved by a latch 328 slidably mounted on a casing enclosing a control unit 325 fixed to the upper rotating plate 321, and two stop plates 318a and 318b mounted to the upper fixed plate 311 while being spaced apart from each other by an angle of 270°, as shown in FIG. 7.

As shown in FIG. 7, a drive unit 324 is mounted on the upper rotating plate 321 of the outer path selector 320 to rotate the entire structure of the outer path selector 320 about the fixed shaft 315. The control unit 325 is also mounted on the upper rotating plate 321 of the outer path selector 320. The control unit 325 serves to maintain the rotated position of the outer path selector 320. The drive unit 324 includes a geared motor, and a drive belt 323 adapted to connect the geared motor to a pulley 316 fixed to the fixed shaft 315. The rotation of the outer path selector 320 is carried out in such a manner that, when the motor of the drive unit 324 rotates, the upper rotating plate 321 is rotated about the central axis of the outer path selector 320, that is, the fixed shaft 315, via the drive belt 323 because the fixed shaft 315 is maintained in a fixed state.

Since the drive unit 324 and control unit 325 of the outer path selector 320 are mounted on the upper rotating plate 321, as described above, they allow the worker to have easy access thereto. Accordingly, it is possible to achieve an improvement in workability, thereby rapidly performing tasks, for example, a repair task, in a high radiation area. That is, there is a reduced amount of radioactive dust in the region where the drive unit 324 and control unit 325 of the outer path selector 320 are arranged, as compared to the region where the inner path selectors 330 are arranged. Also, the upper rotating plate 321 shields a considerable part of radioactive rays from rising upwardly from the region where the inner path selector 330 is arranged. Accordingly, when the worker accesses the drive unit 324 and control unit 325 to repair those units, there is an advantage in that danger to the worker caused by exposure to radioactive rays is relatively reduced. Since the drive unit 324 and control unit 325 are arranged on the upper surface of the upper rotating plate 321, there is also an advantage in that the worker can easily perform repair or replacement of those units.

The latch 328 is operatively connected to a solenoid so that it is selectively engaged with one of latch rods 317a to 317d mounted on the upper fixed plate 311 to extend upwardly. In an activated state of the solenoid, the latch 328 is retracted, so that it is disengaged from the latch rod engaged therewith. In this state, the outer path selector 320 can be rotated when electric power is applied to the motor of the drive unit 324.

Meanwhile, the lower rotating plate 322 is mounted at a lower end of the outer path selector 320 such that it is symmetrical with the upper rotating plate 321. The lower rotating plate 322 is rotated, integrally with the upper rotating plate 321, by virtue of the sleeve rotatably fitted around the fixed shaft 315. The lower rotating plate 322 is provided with circular openings H each adapted to receive a fitting portion of an associated one of the inner path selectors 330 (as seen in a lower part of FIG. 6).

Now, operation of the double indexing path selector unit 300 having the above described configuration will be described. As shown in a concept diagram of FIG. 8a, the upper rotating plate 321 of the outer path selector 320 has a limited rotation range of 0° to 270° in accordance with a limiting function of the stop plates 318a and 318b. In this connection, the latch rods 317a to 317d are arranged at four quadrant positions on the upper fixed plate 311, that is, a 0° position (latch rod 317a), a 90° position (latch rod 317b), a 180° position (latch rod 317c) and a 270° position (latch rod 317d), respectively. The latch 328 of the control unit 325 may be engaged with a selected one of the latch rods 317a to 317d at a corresponding quadrant position. In accordance with the engagement of the latch 328 with a selected one of the latch rods 317a to 317d, the upper rotating plate 321 may be maintained in a fixed state at the corresponding engagement position, that is, the 0° position (latch rod 317a), 90° position (latch rod 317b), 180° position (latch rod 317c) or 270° position (latch rod 317d).

Figure 8A:
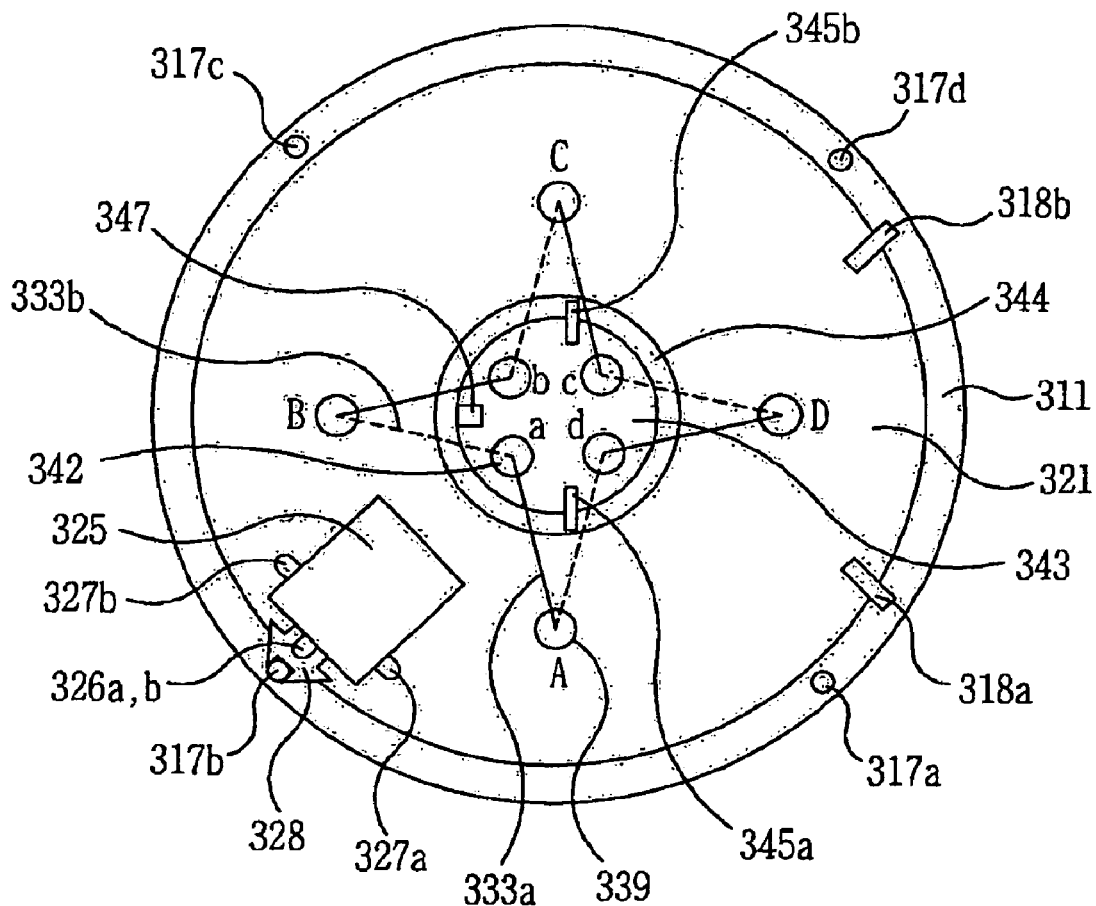
FIG. 8a is a schematic view for explaining operation of the double indexing path selector unit shown in FIG. 7.
Figure 8B:
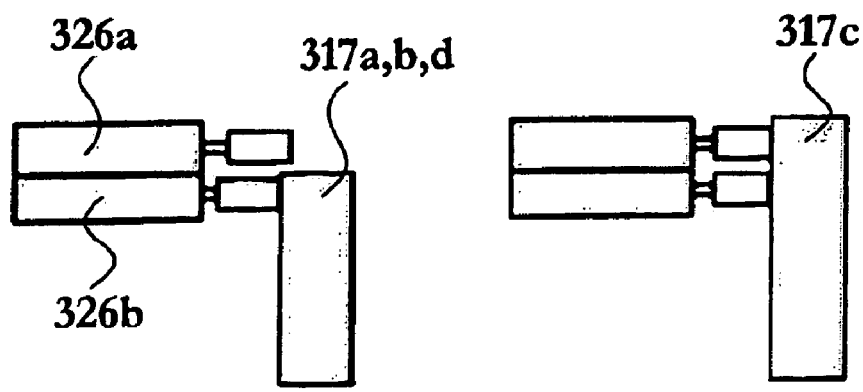
FIG. 8b is a schematic view for explaining operation of limit switches according to the present invention.

In order to detect the position where the outer path selector 320 is maintained in a fixed state, limit switches 326a and 326b are arranged at upper and lower central positions on an outer casing wall of the control unit 325, respectively, as shown in FIG. 8a. Also, limit switches 327a and 327b are arranged at left and right casing walls of the control unit 325, respectively. The position detection may be carried out in such a manner that: the 0° position is detected as the left limit switch 327a is activated by the left stop plate 318a; the 270° position is detected as the right limit switch 327b is activated by the right stop plate 318b; the 90° position is detected as the lower limit switch 326b is activated by the latch rod 317c; and the 180° position is detected as both the upper and lower limit switches 326a and 326b are activated by the latch rod 317c (FIG. 8b). In particular, the detection of the 90° and 180° positions is achieved under the condition in which both the left and right limit switches 327a and 327b are in an inactive state. The latch rod 317c must have a vertical length longer than that of the remaining latch rods 317a, 317b, and 317d so that it can activate the upper limit switch 326a.

On the other hand, an acoustic sound sensor (not shown) is provided at the control unit 325 to remotely monitor an operating state of the double indexing path selector unit 300. The acoustic sound sensor is configured to detect mechanical vibrations, similarly to the acoustic sound sensor 108 of each driver 100. Accordingly, the acoustic sound sensor of the control unit 325 senses a signal generated in the form of mechanical vibrations in the interior of the double indexing path selector unit 300. Sound, which is propagated over air, cannot be sensed by the acoustic vibration sensor. For example, when the drive unit 324 rotates idly due to failure thereof, this state is sensed by the acoustic vibration sensor of the control unit 325.

Figure 9:
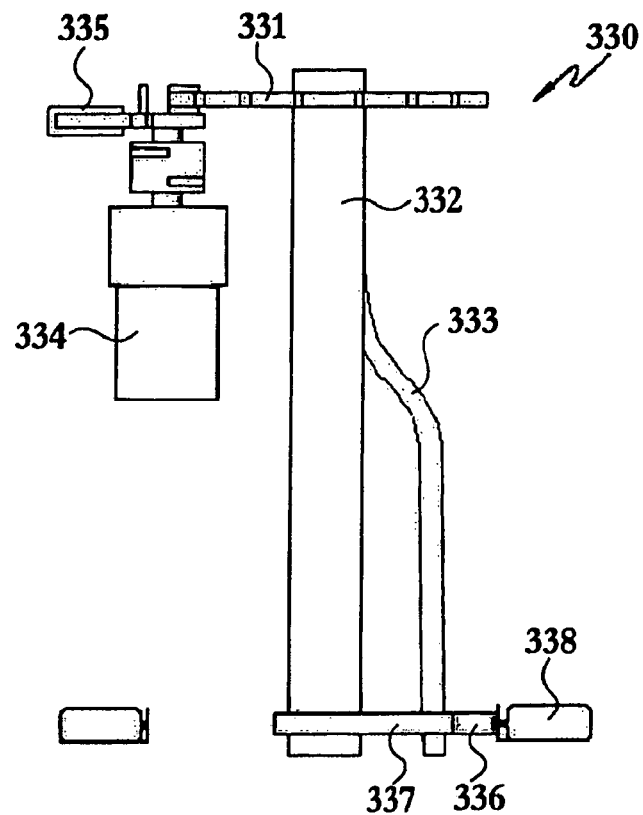
FIG. 9 is a front view illustrating an inner path selector according to the present invention.

As shown in FIGS. 2a, 6 and 9, and described above, there are four inner path selectors 330 arranged around the fixed shaft 315 between the upper and lower rotating plates 321 and 322 of the outer path selector 320 while being circumferentially spaced apart from one another by an angle of 90°. In the illustrated case, each inner path selector 330 is rotatably fitted, at the fitting portion thereof, in the associated opening H of the lower rotating plate 322. As described above, each inner path selector 330 includes one disc 339-1. The disc 339-1 is provided with a certain number of paths P1 determined in accordance with the number of the thimbles in the reactor. Practically, the number of the pathes P1 is determined to be larger than the number of the thimbles in the reactor, so as to provide a more or less number of spare pathes. The paths P1 are circumferentially spaced apart from one another by a desired angle. Thus, each inner path selector 330 serves to select one of the thimbles aligned with respective paths P1 thereof. The inner path selectors 330 perform a revolution about the fixed shaft 315 as the outer path selector 320 rotates. In order to select a desired thimble, each inner path selector 330 also includes one path select tubing 333. The path select tubing 333 is rotatable on the disc 339-1 thereof in accordance with operation of a geared motor 334 provided at the associated inner path selector 330.

Each inner path selector 330 also includes an indexing mechanism 331 adapted to change the path of the path select tubing 333, through which one detector cable 210 extends, and a hollow rotating shaft 332. The path select tubing 333 is connected, at an upper end thereof, to an upper end of the hollow rotating shaft 332 in the interior of the hollow rotating shaft 332. The path select tubing 333 extends downwardly and radially outwardly from the hollow rotating shaft 332 through a hole formed at the hollow rotating shaft 332 such that it reaches the associated disc 339-1 at a lower end thereof. The lower end of the path select tubing 333 is arranged such that it is aligned with an optional one of the paths P1 provided at the associated disc 339-1.

The hollow rotating shaft 332 is axially coupled to the upper and lower rotating plates 321 and 322 such that it is rotatable. The indexing mechanism 331 is rotated about the rotating shaft 332 in accordance with rotation of the rotating shaft 332 carried out by a unit angle corresponding to an angle defined between adjacent ones of the paths P1, every time a driving shaft connected to the geared motor 334 rotates one revolution.

As described above, each disc 339-1 is arranged on the lower end of the associated inner path selector 330 while being fitted in the associated opening H of the lower rotating plate 322. Also, the paths P1 of the disc 339-1 are circumferentially arranged inside the periphery of the disc 339-1 while being spaced apart from one another by a certain angle. The paths P1 extend vertically throughout the disc 339-1 thereof. The lower end of the path select tubing 333 performs an intermittent rotation along the circumferentially-arranged paths P1 as it repeats angular rotation and stopping of the angular rotation in accordance with intermittent angular rotation of the indexing mechanism 331.

Figure 10A:
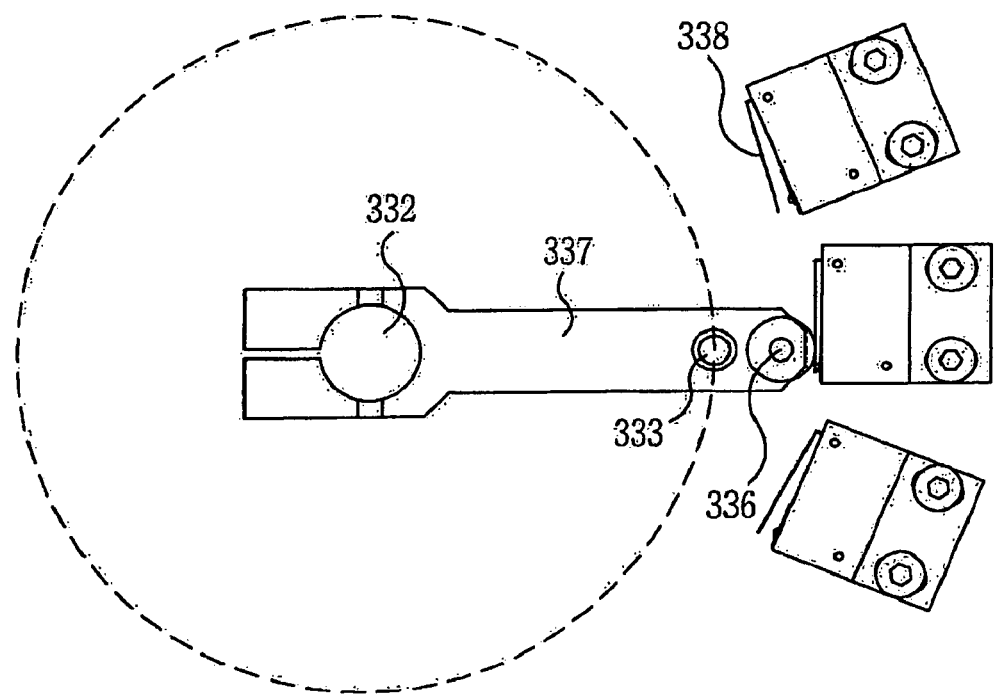
FIG. 10a is a plan view for explaining operation of path select switches according to the present invention.
Figure 10B:
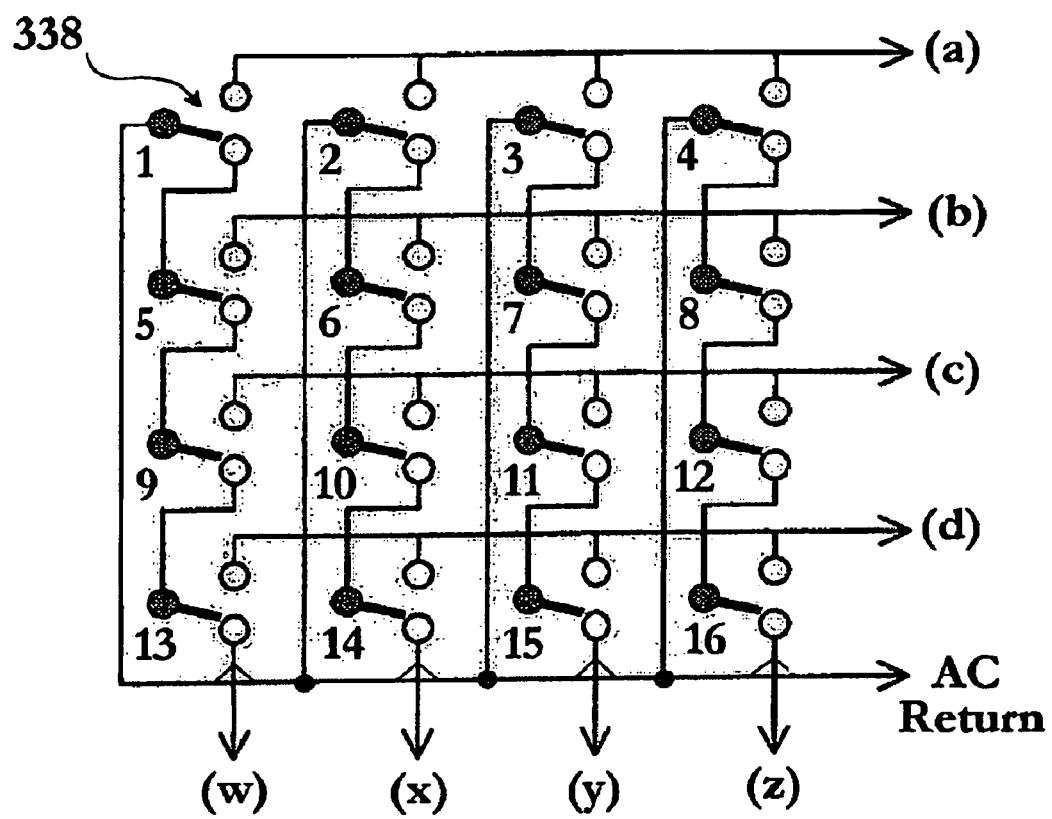
FIG. 10b is a circuit diagram illustrating a matrix arrangement of the path select switches according to the present invention.

Path select switches 338 are mounted on the upper surface of each disc 339-1 outside the paths P1 such that they are radially aligned with respective paths P1, in order to detect the position of the lower end of the associated path select tubing 333. Each path select switch 338 generates a signal to be used as a position control signal for the geared motor 334 adapted to drive the associated index mechanism 331. Where a number of path select switches 338 are used, respective circuits of the path select switches 338 may be connected in the form of a matrix arrangement, as shown in FIG. 10b. In this case, signals generated from the matrix circuit in accordance with a switching operation of each path select switches 338 may be sent to a control system (not shown) for controlling the associated geared motor 334.

As shown in FIG. 9, each indexing mechanism 331 further includes a cam switch 335. The cam switch 335 performs an ON/OFF operation once when the indexing mechanism 331 rotates the unit angle. Based on a signal generated in accordance with such an ON/OFF operation of the cam switch 335, it is possible to check whether or not the associated inner path selector 330 has been rotated to a desired position. Thus, the cam switch 335 provides, along with the path select switches 338, a means for doubly checking a normal operation of the associated inner path selector 330. In response to signals from the path select switches 338 applied thereto, the control system checks whether or not the indexing mechanism 331 and path select switch 338 have operated normally in accordance with a truth table illustrated in FIG. 10c. This checking is achieved, based on the characteristics of the indexing mechanism 331, that is, the characteristics that the indexing mechanism 331 rotates the unit angle when the cam switch 335 performs an ON/OFF operation once. This operation will be described in more detail, in conjunction with the case in which the lower end of the path select tubing 333 is aligned with the path P1 of one disc 339-1 designated by a "Path No. 1" in accordance with a one-unit rotation of the path select tubing 333. In this case, the control system first receives a signal indicative of an once ON/OFF operation of the cam switch 335. Also, the path select switch 338, which corresponds to the path P1 of Path No. 1 while being designated by a "Switch No. 1", is switched on. As a result, the control system receives a high-level signal (H) at an input terminal a thereof, as shown in the matrix circuit of FIG. 10b. At input terminals b, c and d thereof, the control system does not receive any high-level signal. In other words, the control system receives a low-level signal (L) at the input terminals b, c and d. Also, there is no high-level signal applied to an input terminal w of the control system, so that the input terminal w is maintained at a low-level state (L). On the other hand, the remaining input terminals x, y and z of the control system are maintained at a high-level state (H).

These true values are indicated in the leftmost column of the truth table shown in FIG. 10c. Thus, the truth table of FIG. 10c shows true values arranged in association with all switches. Based on the above true values applied thereto, the control system identifies that the path select tubing 333 has been rotated to be aligned with the path P1 of Path No. 1.

If the cam switch 335 or any one of the path select switches 338 operates abnormally, abnormal signals may then be generated. In this case, the control system treats the associated inner path selector 330 as being in a failure state. Where the associated detector 200 is in a state of being inserted in the path select tubing 333 of the inner path selector 330 in this case, the control system performs a control operation to withdraw the detector 200 to a position where withdraw limit switches 351 included in the withdraw limit switch assembly 350 are arranged above the double indexing path selector unit 300. Thereafter, the control system performs a control operation to prevent use of the failed inner path selector 330.

Figure 1A:
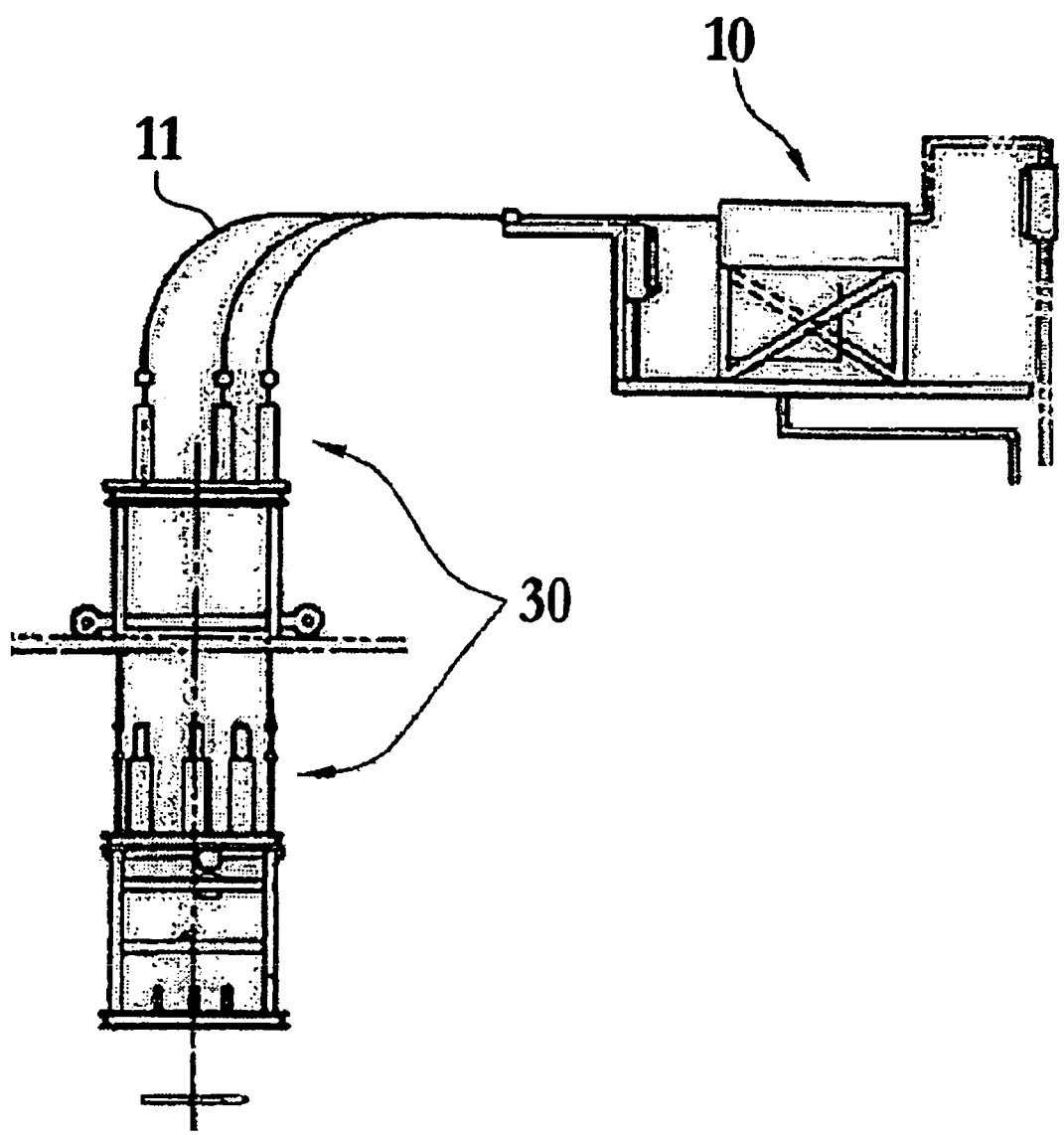
FIG. 1a is a schematic front view illustrating a conventional neutron flux mapping system for a nuclear reactor.
Figure 1B:
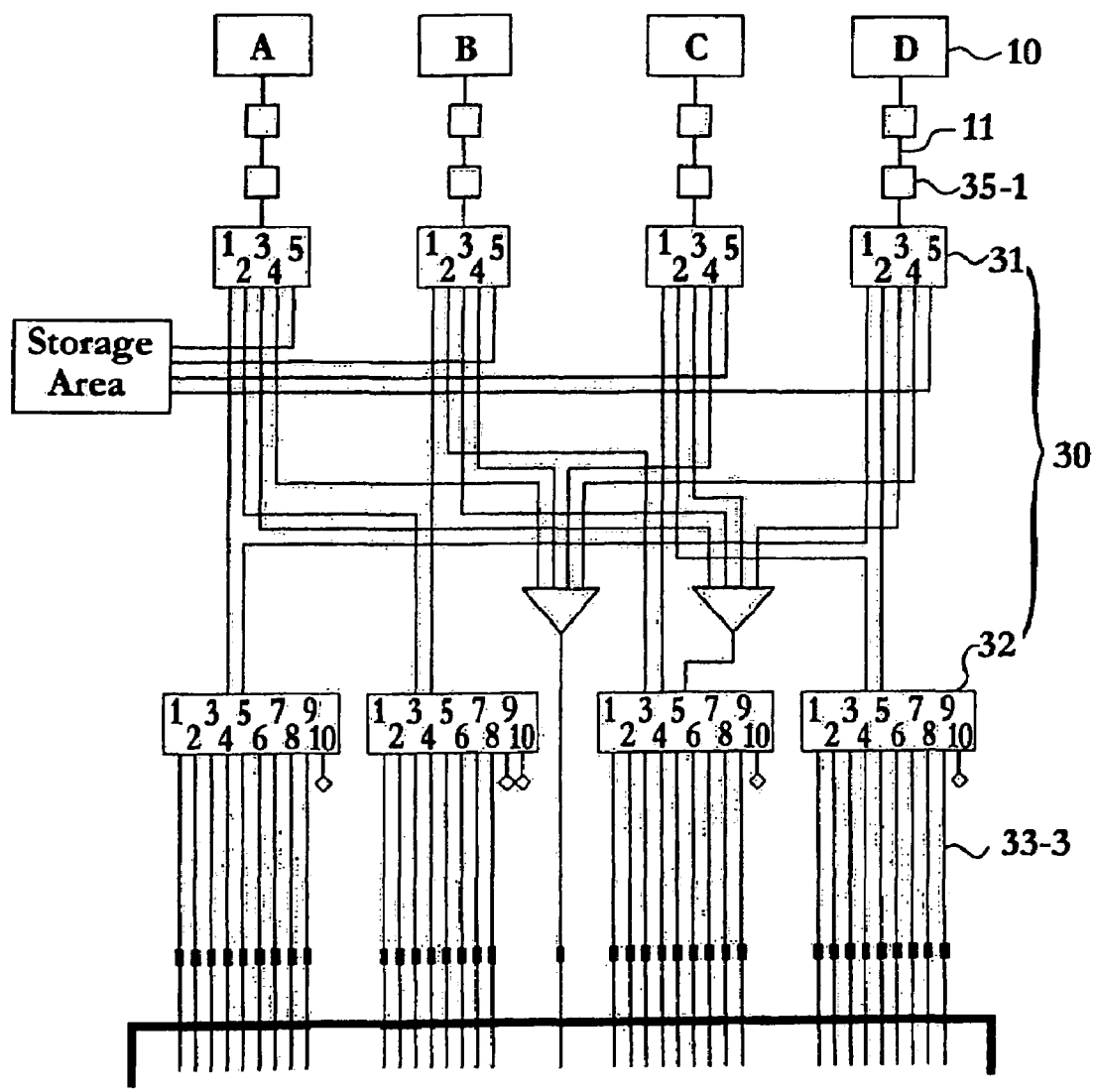

On the other hand, in the conventional case shown in FIG. 1b, a detector cable, which passes a withdraw limit switch 35-1, may reach an associated lower path selector 32 along a selected one of various paths. For this reason, sensors are installed at all tubings 33-3 connected to a lower end of each lower path selector 32, respectively, in order to check whether or not the detector cable has passed through a correctly selected path. Furthermore, the installation of each sensor in the conventional case is achieved by drilling a hole through each tubing 33-3, and fitting the sensor in the hole such that it is protruded into the interior of the tubing 33-3. However, this installation method involves an increased sensor failure rate, in addition to high installation costs. That is, each sensor may frictionally contact the detector cable passing through the associated tubing 33-3, so that a serious friction problem may occur in that a failure may occur in the driving power transmission and detector cable. Furthermore, vibrations may be generated during the movement of the detector cable, so that the sensors may fail frequently.

Figure 2B:
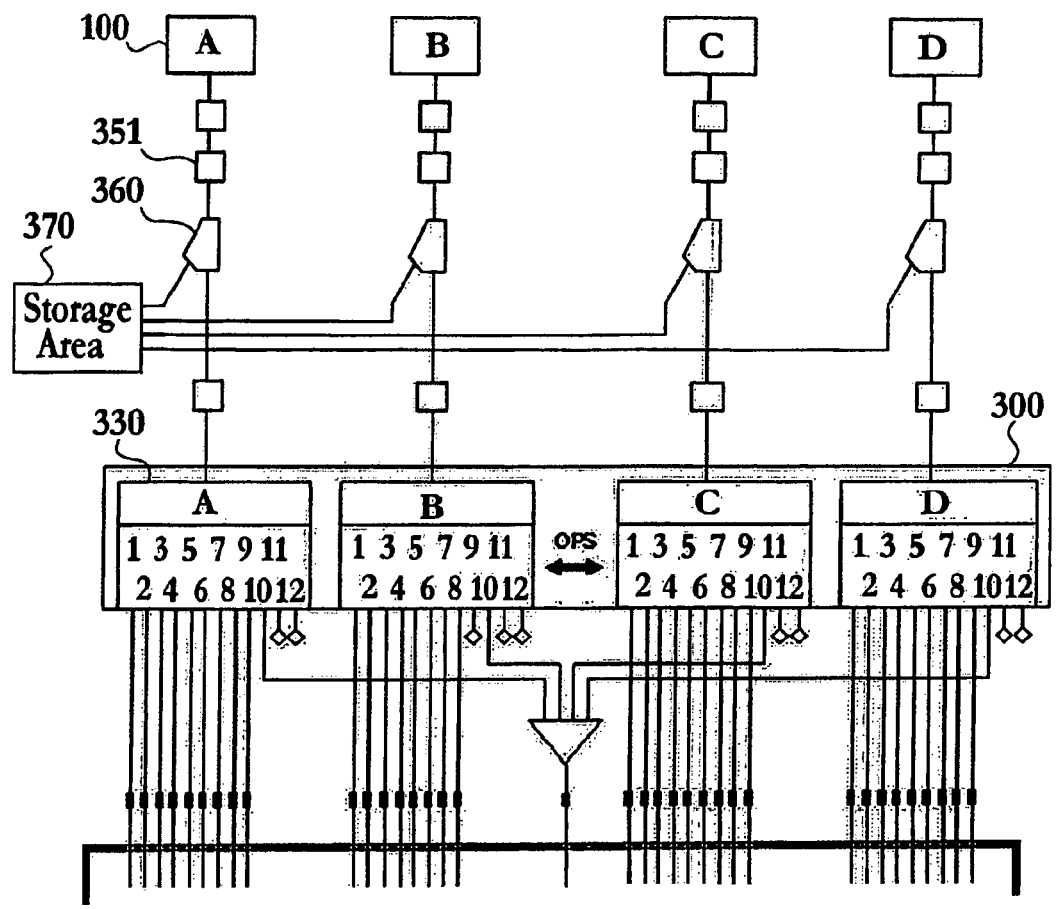

In the double indexing path selector unit 330 according to the present invention, however, the detector of each driver 100, which has passed through the associated withdraw limit switch 351, naturally passes through the associated inner path selector 330, as shown in FIG. 2b. Accordingly, there is an advantage in that it is only necessary to check whether or not the associated path select switch 338 has operated normally, in accordance with the method using the characteristics that the indexing mechanism 331 rotates the unit angle when the cam switch 335 performs an ON/OFF operation once, without an additional requirement to perform checking of the passage of the detector at the lower end of the associated inner path selector 330.

The detailed arrangement and operations relating to the path select switches 338 associated with each inner path selector 330 will now be described with reference to FIG. 10a. A support bar 337 is attached, at one end thereof, to a lower end of the rotating shaft 332 included in each inner path selector 330 to support the path select tubing 333 of the inner path selector 330. A roller 336 is rotatably mounted to the other end of the support bar 337 such that it is spaced apart from a body of each path select switch 338 by a desired clearance to come into soft contact with a contact member of the path select switch 338. In order to secure a desired operational stability of the path select switches 338, the support bar 337 is adapted to rotate only in one direction, for example, a clockwise direction in the illustrated case. To this end, both the associated indexing mechanism 331 and geared motor 334 shown in FIG. 9 are also configured to be driven in one direction.

Meanwhile, where an emergency situation occurs due to failure occurring at the detectors or drivers, the double indexing path selector unit can perform an emergency operation to cope with the emergency situation. That is, as shown in FIG. 7, the double indexing path selector unit performs an emergency operation by rotating the upper rotating plate 321 about the fixed shaft 315 to a certain angular position at intervals of 90° within a range of 270° to substitute the failed detector(s), driver(s) or inner path selector(s) with the normal detector, driver or inner path selector arranged adjacent thereto. This operation will be described in more detail with reference to FIG. 8a. Where all drivers 100, all detectors 200, and all inner path selectors 330 operate normally, the upper rotating plate 321 is maintained in a fixed state. In this state, the inlet detector guide tubings 110 and upper detector guide tubings 111 respectively connected thereto are normally connected to the associated path select tubings 333, respectively, as indicated by solid lines 333a in FIG. 8a (a-A, b-B, c-C, and d-D). However, where the driver 100, detector 200 or inner path selector 330 of a certain channel, for example, the channel A, has failed, the upper rotating plate 321 is rotated by an angle of +90° or −90° to shift the inlet detector guide tubing 110, upper detector guide tubing 111 and inner path selector 330, positioned at a channel B or D adjacent to the failed channel A, to the position of the channel A by 90° (to obtain channel connections a-B (or D), b-B, c-C, and d-D, as indicated by solid and phantom lines 333a and 333b in FIG. 8a). Accordingly, it is possible to achieve a substitutive measurement using the adjacent driver 100, detector 200 or inner path selector 330. In an extreme case in which the driver 100, detector 200, and inner path selector 330 of only one channel, for example, the channel A, operate normally, it is possible to achieve a normal measurement through all paths by sequentially rotating the outer path selector 320 at intervals of 90° up to an angular position of 180° in a forward direction, and up to an angular position of 90° in a backward direction (to obtain channel connections a-A, a-B, a-C, and a-D). Where the outer path selector 320 operates normally, it is possible to achieve a complete measurement through all paths associated with all channels, as long as the driver 100, inlet detector guide tubing 110, and inner path selector 330 associated with at least one of the channels A to D operate normally.

Such a channel relation may be established, as described in the following Table 1:

TABLE 1

Channel Shift Path for Failure Recovery in Double Indexing Path Selector Unit

| Failed Channel | Channel Shift Path | Access Denied Channel |
|---|---|---|
| A | −B or +D | None |
| B | +A or −C | None |
| C | +B or −D | None |
| D | −A or +C | None |
| A, B | ++(CD) | None |
| B, C | ++(DA) | None |
| C, D | ++(AB) | None |
| D, A | ++(BC) | None |
| A, C | +(DB) or −(BD) | None |
| B, D | +(AC) or −(CA) | None |
| A, B, C | +D, ++D, −D | None |
| B, C, D | +A, ++B, −B | None |
| C, D, A | +B, ++B, −B | None |
| D, A, C | +C, ++C, −C | None |

Remarks)
"−" represents a counter-clockwise rotation of 90°, "+" represents a clockwise rotation of 90°, "−−" represents a counter-clockwise rotation of 180°, and "++" represents a clockwise rotation of 180°.

Referring to the above Table 1, it can be seen that it is possible to check all thimbles (100%) as long as at least one of the four channels is in a normal state. Accordingly, although there may be several thimbles preventing insertion of the detector therein due to a poor state thereof, it is possible to satisfy a required operating condition in which it must be possible to perform tasks for at least 75% of thimbles, as prescribed in plant operating technical specifications.

In accordance with the double indexing path selector unit 300 of the present invention, it is possible to measure all thimbles, using only the single-layered 12-path inner path selectors 330, which is illustrated in the embodiment of the present invention illustrated in FIG. 2b, as compared to the conventional path selectors having a double layered architecture including a 5-path layer and a 10-path layer. In accordance with the architecture of the present invention, it is possible to easily identify the position of each detector. Also, since the architecture of the present invention involves a gentle variation in the radius of curvature of tubings, it is possible to prevent damage to each detector cable or erroneous operation of the detector cable caused by an excessive radius of curvature of tubings involved in the conventional double layered architecture.

Such curvature characteristics of the tubings according to the present invention may be concretely seen, referring to the following Tables 2 and 3 associated with equipment installed in Kori Nuclear Power Plant Unit #1 in Korea.

TABLE 2

Lengths and Angles of Tubings between Lower Layer Path Selector and Isolation Valves in Conventional Double Layered Path Selector System

| Path Selector | Tubing Length (cm) | | Tubing Angle (degree) | |
|---|---|---|---|---|
| Channel | Average | Maximum | Average | Maximum |
| A | 170.19 | 185.53 | 25.489 | 34.772 |
| B | 164.39 | 204.49 | 19.041 | 41.819 |
| C | 168.34 | 180.18 | 23.663 | 32.244 |
| D | 166.68 | 196.76 | 20.644 | 39.236 |

TABLE 3

Lengths and Angles of Tubings between Double Indexing Path Selector and Isolation Valves

| System Channel | Tubing Length (cm) | | Tubing Angle (degree) | |
|---|---|---|---|---|
| | Average | Maximum | Average | Maximum |
| A | 235.69 | 265.28 | 14.197 | 22.665 |
| B | 250.90 | 265.86 | 11.917 | 22.960 |
| C | 251.46 | 265.28 | 11.773 | 22.665 |
| D | 250.82 | 261.51 | 10.801 | 20.596 |

Referring to Tables 2 and 3, it can be seen that the double indexing path selector unit having a single layered architecture can have a tubing length increased by about 80 cm, as compared to those in the convention double layered path selector unit, and thus, can have a tubing angle reduced to 23° or below, as compared to a maximum angle of 42° in the double layered path selector unit.

(Guide Tubing Anti-Twister Unit)

As shown in FIG. 2, the inlet detector guide tubings 110 and upper detector guide tubings 111 may be twisted during rotation of the upper rotating plate 321 included in the outer path selector 320. Such a twist phenomenon generates torsion causing the tubings to rotate, and bending force causing the tubings to be shifted. Since the bending force is generated due to a moved distance of the tubings caused by an angular shift thereof, it may be absorbed as the tubings are elastically strained. In order to minimize the elastic strain inflicted on the tubings during the rotation of the outer path selector 320, the detector guide tubings are allocated closely at the guide tubing anti-twister unit 340. The height from the upper rotating plate 321 to the guide tubing anti-twister unit 340 is not less than a predetermined height so as to maintain strain of the tubings within an allowable elasticity range of the tubings.

Figure 11A:
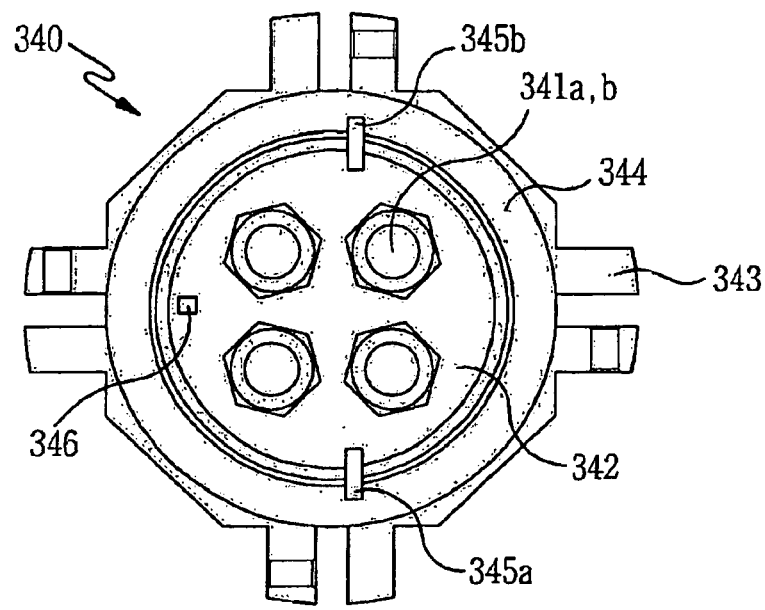
FIGS. 11a and 11b are plan and sectional views illustrating a guide tubing anti-twister unit according to the present invention, respectively.
Figure 11B:
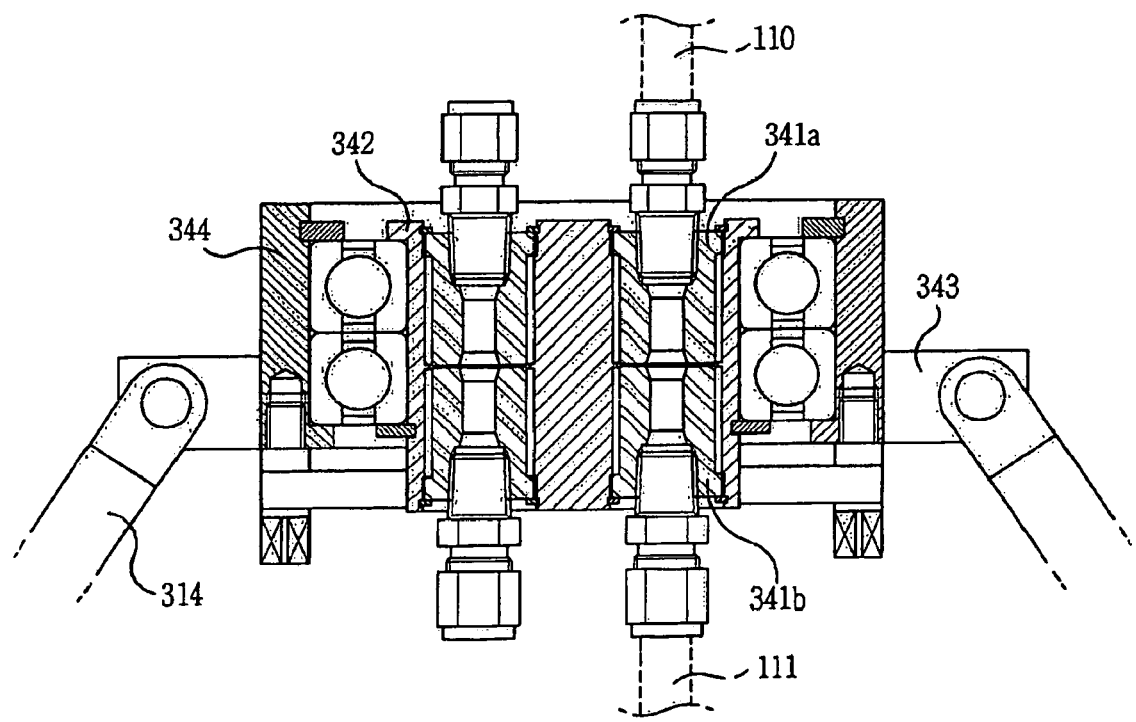

The torsion may be removed by a rotary bearing mechanism installed between a frame of the guide tubing anti-twister unit 340 and the tubings extending through the frame. This configuration will be described in detail with reference to FIGS. 11a and 11b. In order to prevent the inlet detector guide tubings 110 coupled to an upper end of the guide tubing anti-twister unit 340 and the upper detector guide tubings 111 coupled to a lower end of the guide tubing anti-twister unit 340 from being twisted, and thereby, being damaged, the guide tubing anti-twister unit 340 includes an anti-twister frame 344, a rotating plate 342 mounted to the anti-twister frame 344 such that it is rotatable with respect to the anti-twister frame 344, and adapted to carry respective lower ends of the inlet detector guide tubings 110 (via rotors 341a) and respective upper ends of the upper detector guide tubings 111 (via rotors 341b). The guide tubing anti-twister unit 340 also includes stop plates 345a and 345b respectively mounted to diametrically-opposed ends of the anti-twister frame 344 to limit a rotation range of the rotating plate 342 within a range of +90° to −90°, and a stop pin 346 provided on an upper surface of the rotating plate 342 at a peripheral portion of the rotating plate 342. Tie rod hangers 343 are provided at an outer peripheral surface of the anti-twister frame 344. The tie rods 314, which are coupled, at respective lower ends thereof, to the body 310 of the double indexing path selector unit 300, are connected to the tie rod hangers 343 at respective upper ends thereof, so that they are radially arranged.

The rotation range of the rotating plate 342 is limited to 180°. Accordingly, when the outer path selector 320 rotates beyond the rotation range of the rotating plate 342 (that is, through an angle of more than 180°, but not more than 270°), the upper detector guide tubings 111 are strained within a range of 900 in a rotation direction of the outer path selector 320. At this time, the upper detector guide tubings 111 are prevented from being subjected to torsion caused by the rotation thereof, by virtue of the rotors 341b rotatably mounted to a lower portion of the guide tubing anti-twister unit 340 to receive respective upper ends of the upper detector guide tubings 111.

Where the outer path selector 320 is driven to rotate 90° in a state in which the rotating plate 342 cannot rotate as the stop pin 346 is in contact with the stop plate 345a or 345b, longitudinal tension and rotational stress, that is, bending force and torsion, are exerted on the upper detector guide tubings 111 as the outer path selector 320 rotates. Such force is maximized at an intermediate position on a path, along which the outer path selector 320 rotates, (that is, a 45° position). As a result, the rotating plate 342 begins to rotate as the outer path selector 320 rotates beyond the intermediate position. Thus, the 90° rotation of the outer path selector 320 is completely carried out. In such a manner, the upper detector guide tubings 111 connected to both the outer path selector 320 and the rotating plate 342 are maintained in a stable state before the outer path selector 320 and the rotating plate 342 begin to rotate to a 90° position (that is, they are maintained at a 0° position), and after the outer path selector 320 and the rotating plate 342 complete the 90° rotation thereof (that is, they are maintained at the 90° position), as if a mechanical toggle switch operates.

Experimentally, it could be seen that the rotational stress of the inlet detector guide tubings 110 caused by a ±90° twist thereof is only about 100 g·m, so that there is no damage to the tubings 110 caused by the twisting. Also, it could be seen that when the inlet detector guide tubings 110 are positioned at respective positions A, B, C and D arranged in this order in a clockwise direction while being spaced apart from one another by 90°, it is possible to prevent the inlet detector guide tubings 110 from interfering with one another in a +90°-twisted state by appropriately determining respective lengths of the tubings 110 such that the lengths of the tubings 110 arranged at the positions B and C are a certain length shorter than those of the tubings 110 arranged at the positions A and D.

In accordance with the provision of the above described guide tubing anti-twister unit 340, when the outer path selector 320 rotates, this rotation is transmitted to the rotating plate 342 via the upper detector guide tubings 111 in the form of a relatively small rotating force, so that the rotating plate 342 is first rotated. When the rotating plate 342 is no longer rotated as the stop pin 346 comes into contact with the stop plate 345a or 345b, the upper detector guide tubings 111 are rotated about respective rotors 341b coupled to the lower portion of the rotating plate 342 in accordance with the rotating force of the upper rotating plate 321 not absorbed by the guide tubing anti-twister unit 340.

FIG. 12 illustrates the coupling relation among the inner path selectors 330, the rotors 341a and 341b of the guide tubing anti-twister unit 340, and the upper detector guide tubings 111 in accordance with the rotation angle of the outer path selector 320. When the rotation angle of the upper rotating plate 321 of the outer path selector 320 corresponds to 0°, the rotors 341a and 341b of the guide tubing anti-twister unit 340, which are connected to respective inner path selectors 330, are maintained at initial positions thereof (that is, a 0° position), respectively, as shown in FIG. 12. When the upper rotating plate 321 rotates 90° in the clockwise direction, the guide tubing anti-twister unit 340 may also be rotated in the same direction to a 90° position thereof (as shown in the left one of the figures associated with the 90° position). Otherwise, the upper detector guide tubings 111 may be twisted through a certain angle in the clockwise direction under the condition in which the guide tubing anti-twister unit 340 is maintained at an initial state thereof (that is, a 0° position) (as shown in the right figure associated with the 90° position). When the upper rotating plate 321 rotates 180° in the clockwise direction, the guide tubing anti-twister unit 340 may be rotated in the same direction to a 180° position thereof (as shown in the left one of the associated figures). Otherwise, the upper detector guide tubings 111 may be twisted through a certain angle in the clockwise direction under the condition in which the guide tubing anti-twister unit 340 is maintained at a 90°-rotated state thereof (that is, the 90° position) (as shown in the associated right figure). On the other hand, when the upper rotating plate 321 rotates 270° in the clockwise direction, the guide tubing anti-twister unit 340 is maintained at the 180° position thereof after being rotated in the same direction to the 180° position, so that the upper detector guide tubings 111 are twisted through a certain angle in the clockwise direction in accordance with the remaining rotation angle of the upper rotating plate 321 not absorbed by the guide tubing anti-twister unit 340.

Figure 13:
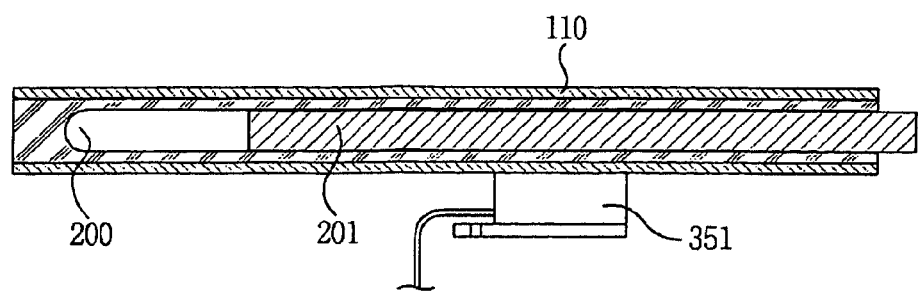
FIG. 13 is a sectional view illustrating an installed condition of a withdraw limit switch according to the present invention.

The withdraw limit switches 351 are installed above the guide tubing anti-twister unit 340 (as seen in FIG. 6). Each withdraw limit switch 351 not only functions to prevent the associated detector 200 from being withdrawn beyond the installation position of the withdraw limit switch 351, but also functions as a reference point for measuring the position of the detector. In the illustrated case, four withdraw limit switches 351 are used to correspond to respective inlet detector guide tubings 110. In this case, each withdraw limit switch 351 is attached to an outer peripheral surface of the associated inlet detector guide tubing 110 in a state of being supported by a casing of the withdraw limit switch assembly 350 such that they do not interfere with one another As shown in FIG. 13, each withdraw limit switch 351 is activated by the associated detector 200 and detector cable, which have ferrous magnetic body. For each withdraw limit switch 351, a non-contact type self-contained proximity reed switch, which carries a magnet therein, is preferably used to eliminate the need to drill a hole through the associated inlet detector guide tubing 110 for identification of the position of the associate detector 200. In this case, accordingly, it is possible to prevent the detector cables 201 from being damaged due to friction, which may be generated in the conventional case in which a contact type switch is installed in a state of being protruded into the associated inlet detector guide tubing, so that it may come into frictional contact with the associated detector cable. Such a non-contact type proximity reed switch generally has an advantage in that it is strong agains radioactive rays because no semiconductor element is contained in the reed switch, as compared to non-contact type solid state proximity switches, which contain semiconductor elements.

Meanwhile, a detector storage guider 360 is installed at each inlet detector guide tubing 110 to guide the associated detector to a detector storage area 370, in order to safely store the detector emitting a large amount of radioactive rays when the neutron flux mapping system is not in operation.

As apparent from the above description, the present invention can provide a neutron flux mapping system for a nuclear reactor, which has improvements in structures of drivers, path selectors, etc., thereby being capable of reducing the installation space thereof, while achieving a reduction in the failure rate thereof, so that it is more safe and efficient in terms of maintenance and repair.

The present invention can also provide a neutron flux mapping system for a nuclear reactor, which is cable of, even when a failure occurs in a part of path selectors thereof, achieving measurement of neutron flux through all thimbles, using the remaining path selectors.

What is claimed is:

1. A neutron flux mapping system for a nuclear reactor comprising:

drivers each including a geared motor, a helical gear driven by the geared motor, and a storage reel adapted to supply, to the helical gear, a detector cable carrying a detector; and a double indexing path selector unit including a body including upper and lower fixed plates, and tie rods connecting the upper and lower fixed plates, a fixed shaft fixedly mounted at a central portion of the body, an outer path selector arranged to be rotatable about the fixed shaft, the outer path selector including an upper rotating plate arranged to be rotatable about the fixed shaft while carrying a drive unit for rotating the outer path selector about the fixed shaft, and a control unit for controlling the drive unit, and a lower rotating plate arranged to be symmetrical with the upper rotating plate, and connected to the upper rotating plate to rotate along with the upper rotating plate, and inner path selectors each including a hollow rotating shaft rotatably mounted between the upper and lower rotating plates of the outer path selector, a path select tubing connected, at an upper end thereof, to an upper end of the rotating shaft in the interior of the rotating shaft while extending downwardly and radially outwardly from the rotating shaft through a hole formed at the rotating shaft, and a disc mounted to a lower end of the rotating shaft, and provided with a plurality of circumferentially-arranged paths.

2. The neutron flux mapping system according to claim 1, wherein the geared motor comprises an induction motor adapted to be controlled by an inverter.

3. The neutron flux mapping system according to claim 1, wherein:

each driver further includes means for bring the helical gear into close contact with the detector cable; and the means comprises at least one idle gear.

4. The neutron flux mapping system according to claim 3, wherein the at least one idle gear comprises:

a first idle gear arranged to face the helical gear in a horizontal direction; and a second idle gear arranged to face the helical gear in a vertical direction.

5. The neutron flux mapping system according to claim 4, wherein the second idle gear is arranged toward the detector cable outlet in advance of a vertical center line of the helical gear by a predetermined angle.

6. The neutron flux mapping system according to claim 1, wherein each driver further includes an AC torque motor adapted to drive the storage reel.

7. The neutron flux mapping system according to claim 1, wherein each driver further includes an acoustic vibration sensor.

8. The neutron flux mapping system according to claim 1, wherein:

the upper fixed plate is provided with stop plates; and the control unit of the upper rotating plate is provided with limit switches, which selectively come into contact with the stop plates, respectively.

9. The neutron flux mapping system according to claim 8, wherein the stop plates are arranged to allow the upper rotating plate to rotate through a predetermined angle in a reciprocating manner.

10. The neutron flux mapping system according to claim 8, wherein:

the control unit of the upper rotating plate is provided with a latch; and the upper fixed plate of the selector unit body is provided with latch rods engagable with the latch.

11. The neutron flux mapping system according to claim 10, wherein the control unit further includes a plurality of limit switches adapted to detect a rotated position of the upper rotating plate in cooperation with the latch rods.

12. The neutron flux mapping system according to any one of claims 8 to 11, wherein the control unit further includes an acoustic vibration sensor.

13. The neutron flux mapping system according to any one of claims 1 to 8, wherein the driving unit and the control unit are mounted on an upper surface of the upper rotating plate.

14. The neutron flux mapping system according to claim 1, wherein:
   each inner path selector further includes an indexing mechanism adapted to rotate the rotating shaft such that the path select tubing is aligned with a selected one of the paths;
   the indexing mechanism includes a plurality of path select switches arranged around the disc to correspond to the paths, respectively, each of the path select switches sensing alignment of a corresponding one of the paths with the path select tubing, thereby generating a sensing signal; and
   the indexing mechanism is driven by a geared motor controlled by the sensing signal.

15. The neutron flux mapping system according to claim 14, wherein the plurality of path select switches are connected in the form of a matrix arrangement while being coupled to an input module included in a control system.

16. The neutron flux mapping system according to claim 15, wherein the control system controls the geared motor of the indexing mechanism, based on signals received from the path select switches.

17. The neutron flux mapping system according to claim 16, wherein:
   the indexing mechanism further includes a cam switch adapted to perform an ON/OFF operation every time the indexing mechanism rotates a predetermined unit angle; and
   the control system checks, based on a signal generated in accordance with the ON/OFF operation of the cam switch, whether or not the indexing mechanism and the path select switches operate normally.

18. The neutron flux mapping system according to claim 17, wherein, when the index mechanism or one of the path select switches operates abnormally, the control system performs a control operation for treating, as being in a failure state, the inner path selector associated with abnormally-operating the index mechanism or path select switch, withdrawing the associated detector to a predetermined position when the detector has been inserted into the inner path selector, and preventing use of the inner path selector.

19. The neutron flux mapping system according to claim 1, wherein the double indexing path selector unit further includes tubing anti-twister means.

20. The neutron flux mapping system according to claim 19, wherein the tubing anti-twister means comprises:
   an anti-twister frame; and
   a rotating plate rotatably mounted in the anti-twister frame.

21. The neutron flux mapping system according to claim 20, wherein:
   the rotating plate is provided with a stop pin; and
   the anti-twister frame is provided with stop plates engagable with the stop pin.

22. The neutron flux mapping system according to claim 21, wherein the stop plates are respectively mounted to diametrically-opposed ends of the anti-twister frame.

23. The neutron flux mapping system according to any one of claims 20 to 22, wherein the rotating plate is further provided with rotors.

24. The neutron flux mapping system according to claim 19, wherein the tubing ant-twister means further comprises withdraw limit switches each adapted to detect passage of the detector cable, associated therewith, through the double indexing path selector unit.

25. The neutron flux mapping system according to claim 24, wherein each of the withdraw limit switches is a non-contact type proximity reed switch.

26. The neutron flux mapping system according to claim 1, further comprising:
   detector storage guiders each arranged between an associated one of the drivers and the double indexing path selector unit; and
   a detector storage area adapted to store the detector guided by an associated one of the detector storage guiders.

* * * * *